United States Patent
Nam et al.

(10) Patent No.: US 6,292,163 B1
(45) Date of Patent: Sep. 18, 2001

(54) SCANNING LINE DRIVING CIRCUIT OF A LIQUID CRYSTAL DISPLAY

(75) Inventors: Yim Ho Nam; Kwon Sun Kil; Lee Jung Yeal, all of Suwon (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/103,403

(22) Filed: Jun. 24, 1998

(30) Foreign Application Priority Data

Jun. 25, 1997 (KR) .................................. 97/27390

(51) Int. Cl.[7] ................. G09G 3/36; G09G 5/00
(52) U.S. Cl. ............... 345/100; 345/92; 345/204
(58) Field of Search ............... 345/92, 204, 205, 345/206, 100; 248/346.01

(56) References Cited

U.S. PATENT DOCUMENTS

| 4,795,239 | 1/1989 | Yamashita et al. | 350/333 |
|---|---|---|---|
| 5,448,384 | * 9/1995 | Uchino et al. | 345/92 |
| 5,903,249 | * 5/1999 | Koyama et al. | 345/92 |
| 5,945,970 | * 8/1999 | Moon et al. | 345/92 |
| 5,995,074 | * 11/1999 | Kusafuka et al. | 345/90 |

FOREIGN PATENT DOCUMENTS

| 1156725 | 6/1989 | (JP) . |
|---|---|---|
| 9160073 | 6/1997 | (JP) . |

* cited by examiner

Primary Examiner—Jeffery Brier
Assistant Examiner—Ryan Yang
(74) Attorney, Agent, or Firm—Selitto, Behr & Kim

(57) ABSTRACT

A scanning line driving circuit of a liquid crystal display having a discharging path for discharging charges of gate lines, including a driving portion for generating scanning line driving signals for driving scanning lines of a LCD panel according to external two-phase clock signals; and a discharging portion for discharging the scanning line driving signals from the driving portions to a common voltage terminal of an upper substrate.

11 Claims, 3 Drawing Sheets

SCANNING LINE DRIVING CIRCUIT OF A LIQUID CRYSTAL DISPLAY

BACKGROUND OF THE INVENTION

This invention relates to liquid crystal displays (LCDs) where a charge transfer scanning circuit is integrated into a LCD panel, and more particularly to a scanning line driving circuit for LCDs having discharging path for automatically discharging charges on scanning lines.

In general, a gate driver IC for scanning a LCD panel and a source driver IC for providing data to the LCD panel are respectively fabricated and then the driver ICs are packaged to the LCD panel. Because the conventional LCD packaging techniques fabricate driver ICs separately and package the driver ICs to the LCD panel, they have disadvantages in that the yield is reduced and the production cost rises.

To solve the problems occurred in case where driver ICs are separately fabricated and are packaged to a LCD panel, LCDs is which driver ICs are integrated into the LCD panel are proposed. FIG. 1 shows a LCD disclosed in Korean Patent Application No. 96-77694, in which a gate driver IC is integrated into a LCD panel. The gate driver-integrated LCD comprises a LCD panel 100, a gate driver IC 200 integrated into the LCD panel 100, a data driver IC 300 and a controller 500.

The LCD panel 100 comprises an upper glass substrate 110 where a color filter array is formed, a lower glass substrate 120 where a thin film transistor (TFT) array is formed, and LCs, not shown in FIG. 1, injected between the upper and lower glass substrates 110 and 120. Together with the TFT array, the gate driver IC 200 which drives scanning lines SL11 through SL1n of the LCD panel 100 is integrated in the lower glass substrate 120.

In the same manner as conventional LCDs, the data driver IC 300 is mounted on a tape carrier package(TCP) 400 and a pad part 310 of the data driver IC 300 is wire-bonded to the LCD panel 100. The controller 500 is for providing clock signals and data signals to the gate driver IC 200 integrated into the LCD panel 100 and the data driver IC 300. The controller 500 provides two-phase clock signals to the gate driver IC 300 through the LCD panel 100 and the data driver IC 300.

The gate driver IC 200 that is, the scanning line driving circuit is integrated into the portion of the lower glass substrate 120 which is not overlapped with the upper glass substrate 110 in an integrating TFT array. The detailed diagram of the scanning line driving circuit is shown in FIG. 2. The charge transfer type scanning line driving circuit 200 comprises a plurality of driving means 211–21n for driving scanning lines SL11–SL1n of the LCD panel 100, respectively.

The driving means 211–21n generate scanning line driving signals Vg_out1–Vg_outn to drive the scanning lines SL11–SL1n, respectively. Each of the driving means 211–21n comprises a first TFT T111–T11n for charge transfer, in which a clock signal Q1 or Q2 from the controller 500 is applied to a gate thereof, a capacitor C111–C11n for charge, which is connected to a source and the gate of the first TFT T111–T11n, and a second TFT T121–T12n for a buffer in which the source of the first TFT T111–T11n is connected to a gate thereof and which is driven by the first TFT T111–T11n to generate the scanning line driving signal Vg_out1–Vg_outn to the scanning line SL11–SL1n of the LCD panel 100.

In the plurality of driving means 211–21n, a predetermined voltage Vin of high level is applied to a drain of the first TFT T111 of the first driving means 211. A source of the first TFT of one of the plurality of driving means is connected to a drain of the first TFT of the following driving means. For example, the source of the first TFT T112 of the second driving means 212 is connected to the drain of the first TFT T113 of the third driving means 213. A gate voltage Vgh of the predetermined high level is applied to drains of the second TFTs T121–T12n.

The operation of the charge transfer type scanning line driving circuit will be described in detail below. Supposed that the first clock signal Q1 of two-phase clock signals Q1 and Q2 is turned on and the second clock signal Q2 is turned off. The first clock signal Q1 is applied to the first driving means 211. The first transistor T111 is tuned on by the first clock signal Q1 and the input voltage Vin of a predetermined high level is provided to the gate of the second transistor T121 through the first TFT T111. The second transistor T121 is turned on by the input voltage Vin. The gate voltage Vgh is provided to the first scanning line SL11 of the LCD panel 100 as the first scanning line driving signal Vg_out1 through the second TFT T121.

Subsequently, the first clock signal Q1 is turned off and the second clock signal Q2 is turned on. The second clock signal Q2 is provided to the second driving means 212 and charges charged to the capacitor C111 are applied to the drain of the first TFT T112 of the second driving means 212. The first TFT T112 of the second driving means 212 is turned on by the second clock signal and the charges charged in the capacitor C111 are provided to the gate of the second TFT T122 through the first transistor T112 and to the capacitor C112. The second transistor T122 is turned on. Accordingly, the gate voltage Vgh is provided through the second transistor T122 as the second scanning line driving signal Vg_out2 to the second scanning line SL12 of the LCD panel 100.

As above described, the first through the nth driving means 211–21n are driven to generate the first through the nth scanning line driving signals Vg_out1–Vg_outn in turn with repeated turning-on and turning-off of two clock signals Q1 and Q2. Therefore, the first through the nth scanning lines SL11–SL1n of the LCD panel 100 are driven in turn by the first through the nth scanning line driving signals Vg_out1–Vg_outn.

As compared with the conventional LCDs in which the driver ICs are fabricated and then packaged to the LCD panel, the LCD of FIG. 1 and FIG. 2 can improve yield and cost down by integrating the gate driver IC into the lower glass substrate together with the TFT array. However, because the scanning driving circuit of FIG. 2 has no discharge path, the charges charged to the scanning line can not be discharged, when the following scanning line driving signal is generated, following the generation of any one of the scanning line driving signals. For example, when the second scanning line driving signal Vg_out2 is generated to the second scanning line SL12, following the generation of the first scanning line driving signal Vg_out1 to the first scanning line SL11, charges charged to the first scanning line driving signal SL11 are not discharged. Accordingly, the second TFT T122 of the second driving means 212 is turned on and the second scanning line driving signal Vg_out2 is applied to the second scanning line SL12 while the first scanning line driving signal Vg_out1 is present in the first scanning line SL11, thereby resulting in deteriorating picture quality of LCD.

SUMMARY OF THE INVENTION

An object of the present invention is to provide a scanning line driving circuit-integrated LCD capable of solving the problem according to package of driver IC and minimizing size thereof.

Another object of the present invention is to provide a scanning line driving circuit-integrated LCD having discharging means which prevents the deterioration of picture quality.

According to the present invention, there is provided a scanning line driving circuit of a liquid crystal display(LCD) including a LCD panel where liquid crystals are injected between an upper substrate and a lower substrate in which a thin film transistor array is integrated thereto and the scanning line driving circuit for driving scanning lines of the LCD panel, comprising: a driving means for generating scanning line driving signals for driving the scanning lines of the LCD panel according to external clock signals; and a discharging means for discharging the scanning line driving signals generated to the scanning lines from the driving means through a common voltage terminal of the upper glass substrate.

In the scanning line driving circuit of an embodiment, the driving means includes a plurality of scanning line driving means for generating the scanning line driving signals to the scanning lines of the LCD panel according to the clock signals, respectively. Each of the scanning line driving means includes: a first thin film transistor (TFT) for charge transfer in which one of the clock signals is applied to a gate thereof; a capacitor connected between the gate and a source of the first TFT; and a second TFT in which the source of the first TFT is connected to a gate thereof and which is driven by the first TFT to generate the scanning line driving signal to the scanning line of the LCD panel. The source of the first TFT in one of two neighboring scanning line driving means of the driving means is connected to the drain of the first TFT in the other of the two neighboring scanning line driving means.

In the scanning line driving circuit of an embodiment, an input voltage of a selected high level which is sufficient to drive the second TFT of the first scanning line driving means, is provided to a drain of the first TFT in a first scanning line driving means of the plurality of scanning line driving means. A selected high level voltage is commonly applied to drains of the second TFTs of the plurality of scanning line driving means, and the selected high level voltage is a high level voltage of the pulse which is applied to gates of the TFT array.

In the scanning line driving circuit of an embodiment, the capacitor of the scanning line driving means is a capacitor having a structure in which the source or drain and the gate of the first TFT are used as upper and lower plates and an insulator formed between the source or drain and the gate is used as a dielectric film; a capacitor having a structure in which the source or drain and the common voltage terminal of the upper glass substrate are used as lower and upper plates and the liquid crystals injected between the upper and lower substrates are used as a dielectric film; or a capacitor which is separately integrated to the lower glass substrate from the first TFT.

In the scanning line driving circuit of an embodiment, the clock signals are two-phase clock signals having the same width as the pulse applied to the gate of the TFT array. Odd scanning line driving means of the plurality of scanning line driving means are driven by one of the two phase clock signals to generate the scanning line driving signals for odd scanning lines and even scanning line driving means of the plurality of scanning line driving means are driven by the other to generate the scanning line driving signals for even scanning lines.

In the scanning line driving circuit of an embodiment, the discharging means includes a plurality of scanning line driving means for discharge the scanning line driving signals generated to the scanning lines from the driving means through the common voltage terminal of the upper glass substrate. Each of the plurality of scanning line discharging means discharges the scanning line driving signal generated to a corresponding one of the scanning lines by the scanning line driving signal for driving the next scanning line of the scanning lines and, includes a TFT where a drain is connected to a corresponding one of the scanning lines, a gate is connected to the next scanning line of the scanning lines and a source is connected to the common voltage terminal.

There is also provided a scanning line driving circuit of a liquid crystal display (LCD) including a LCD panel where liquid crystals are injected between an upper glass substrate and a lower glass substrate in which a thin film transistor array is integrated thereto and the scanning line driving circuit for driving scanning lines of the LCD panel, comprising: a driving means for generating scanning line driving signals for driving the scanning lines of the LCD panel according to external clock signals, said driving means including a plurality of scanning line driving means for generating the scanning line driving signals to the scanning lines of the LCD panel according to the clock signals, respectively; and a discharging means for discharging the scanning line driving signals from the driving means to a common voltage terminal of the upper glass substrate, said discharging means including a plurality of scanning line discharging means for discharging the scanning line driving signals generated to the scanning lines from the driving means;

wherein a corresponding one of the scanning line driving signals from the plurality of scanning line driving means in the driving means drives a corresponding one of the plurality of scanning lines and discharges the scanning line driving signal generated to the previous scanning line through a corresponding one of the plurality of scanning line discharging means in said discharging means.

There is provided a scanning line driving circuit of a liquid crystal display (LCD) including a LCD panel where liquid crystals are injected between an upper glass substrate and a lower glass substrate in which a thin film transistor array is integrated thereto and the scanning line driving circuit for driving scanning lines of the LCD panel, comprising: a driving means for generating scanning line driving signals for driving the scanning lines of the LCD panel according to external clock signals, said driving means including a plurality of scanning line driving means for generating the scanning line driving signals to the scanning lines of the LCD panel according to the clock signals, respectively, each of scanning line driving means including a first thin film transistor (TFT) in which one of the clock signals is applied to a gate thereof; a capacitor connected between the gate and a source of the first TFT; and a second TFT which the source of the first TFT in is connected to a gate thereof and which is driven by the first TFT to generate the scanning line driving signal to the scanning line; and a discharging means for discharging the scanning line driving signals from the driving means, said discharging means includes a plurality of scanning line discharging means for discharging the scanning line driving signals generated to the scanning lines from the driving means, each of the plurality of scanning line discharging means including a TFT where a drain is connected to a corresponding one of the scanning lines, a gate is connected to the next scanning line of the scanning lines and a source is connected to a common voltage terminal of the upper glass substrate.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DETAILED DESCRIPTION OF THE PREFERRED EMBODIMENT

Figure 1:
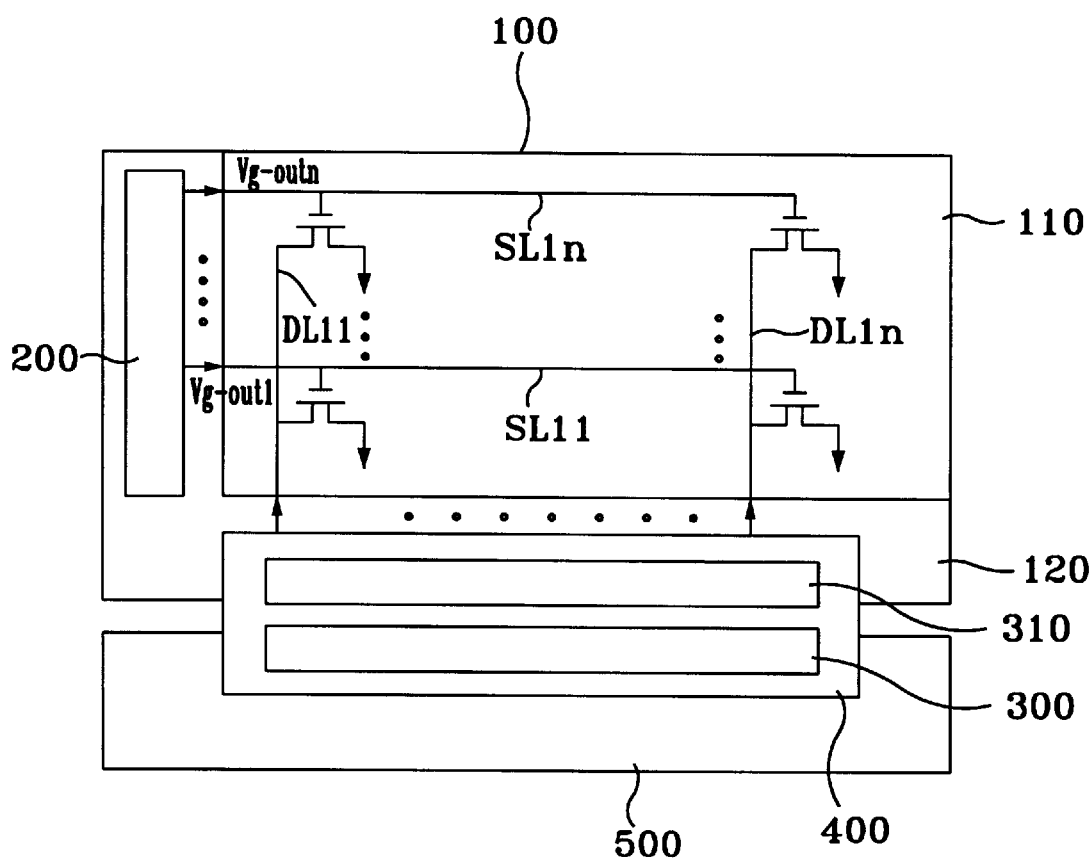
FIG. 1 is a construction diagram of the LCD shown in Korean Application No. 96-776954.
Figure 2:
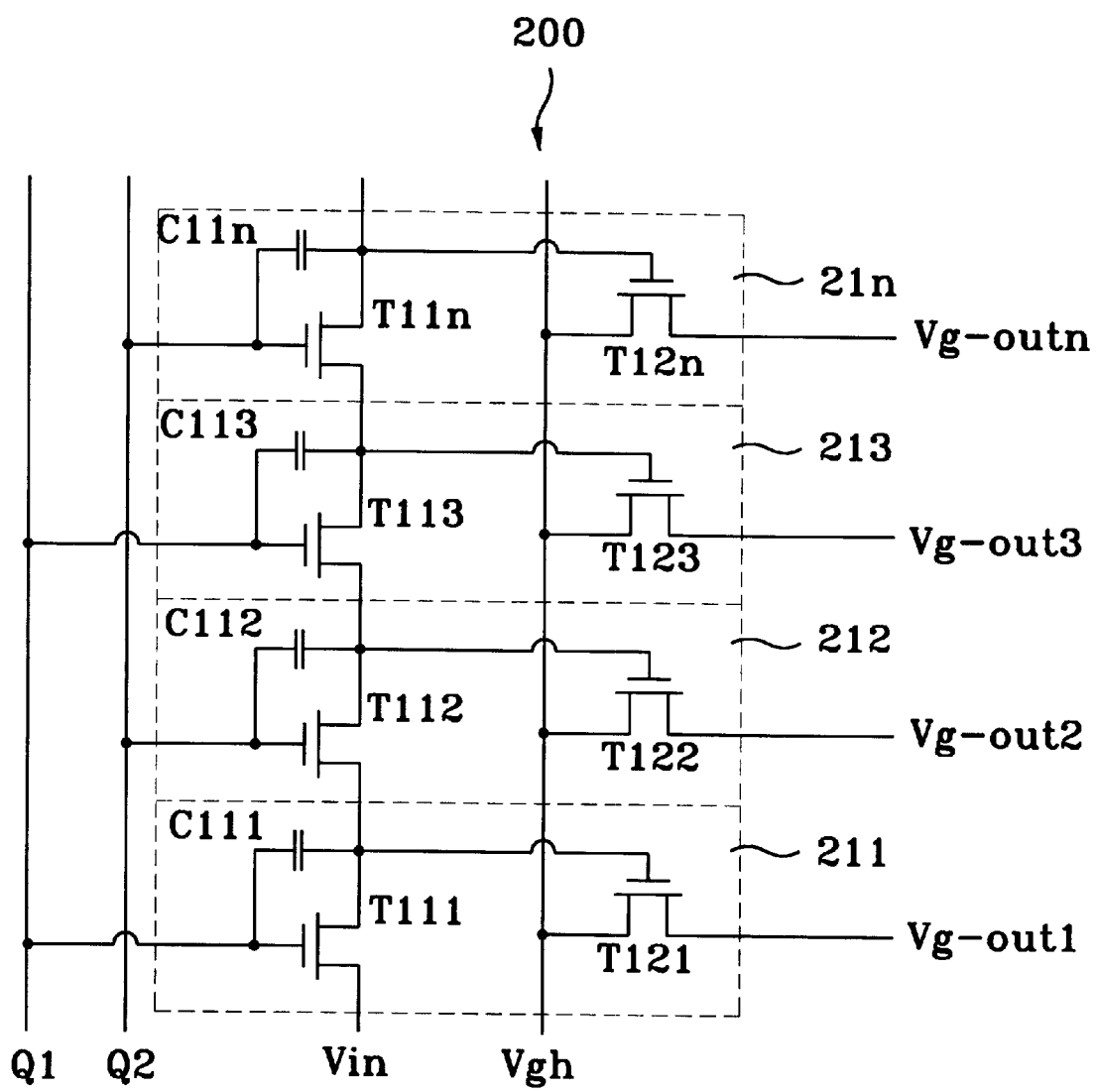
FIG. 2 is a detailed diagram of a charge transfer type scanning line driving circuit of the LCD in FIG. 1.
Figure 3:
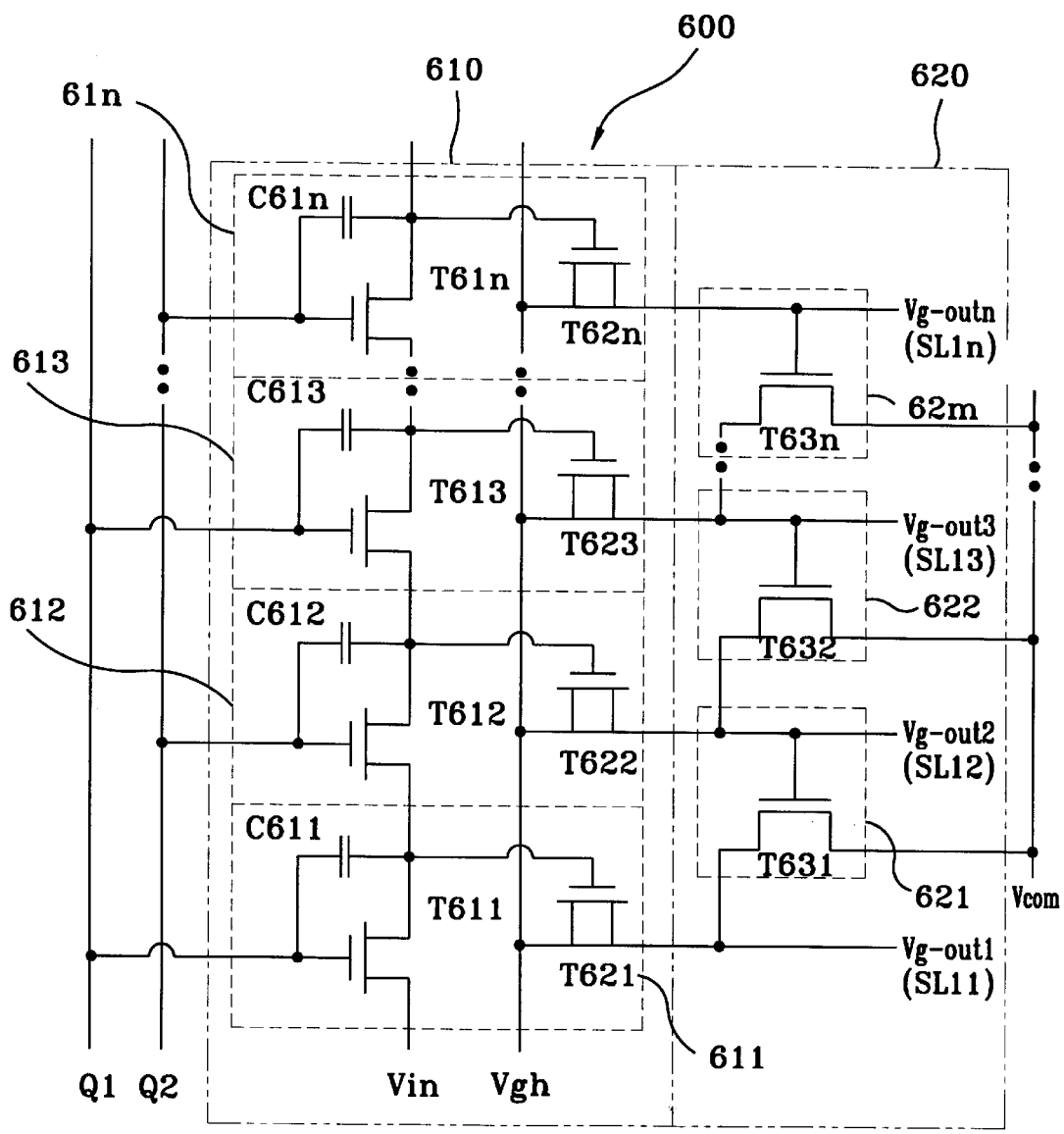
FIG. 3 is a detailed diagram of a charge transfer type scanning line driving circuit integrated into an LCD in accordance with an embodiment of the present invention.

FIG. 3 is a detailed circuit diagram of a charge transfer type scanning line driving circuit 600 in a LCD in accordance with an embodiment of the present invention. The LCD of the embodiment of the present invention has the same construction and a LCD panel, a data driver IC and a controller operate as the LCD of FIG. 1. The construction and operation of the scanning line driving circuit 600 of the LCD in the present invention are different from them in the LCD shown in FIGS. 1 and 2.

Referring to FIG. 3, the charge transfer type scanning line driving circuit 600 of the present invention comprises a driving portion 610 which generates scanning line driving signals Vg_out1–Vg_outn for driving scanning lines SL11–SL1n of the LCD panel 100 according to clock signals Q1 and Q2 from the controller 500 and a discharging portion 620 for discharging charges charged in the driving portion 610.

The driving portion 610 comprises a plurality of scanning line driving portions 611–61n for generating the scanning line driving signals Vg_out1–Vg_outn to the scanning lines SL11–SL1n of the LCD panel 100 according to the two phase clock signals Q1 and Q2 from the controller 500, respectively. Each of the scanning line diving portions 611–61n comprises a first TFT T611–T61n for charge transfer where the clock signal Q1 or Q2 is applied to a gate, a capacitor C611–C61n for charge which is connected between a source and a gate of the first TFT T611–T61n, and a second TFT T621–T62n for buffer in which its gate is connected to the source of the first TFT T611–T61n and which is driven by the first TFT T611–T61n to generate the scanning line driving signals Vg_out1–Vg_outn.

In the scanning line driving portions 611–61n of the driving portion 610, an input voltage Vin of a predetermined high level is applied to the drain of the first TFT T611 of the first scanning line driving portion 611. The source of the first TFT in one of the scanning line driving portions is connected to the drain of the first TFT in the next scanning line driving portion. For example, the source of the first TFT T611 in the first scanning line driving portion 611 is connected to the drain of the first TFT T612 in the second scanning line driving portion 612. A gate voltage Vgh of a predetermined high level is commonly applied to the drains of the second TFT T621–T62n in the respective scanning line driving portions 611–61n.

Herein, because the input voltage Vin which is applied to the drain of the first TFT T611 of the first scanning line driving portion 611 is provided to the gate of the second TFT T612 through the first TFT T611, it should a the voltage sufficient to drive the second TFT T621–T62n and the gate voltage Vgh which is commonly applied to the drains of the second TFT T621–T62n in the respective scanning line driving portions 611–61n is a high state voltage of pulse applied to gates of switching TFTs integrated in the lower substrate.

The clock signals Q1 and Q2 of two-phase have the pulse widths equal to the gate pulse width. The first clock signal Q1 is provided to the odd scanning line driving portions 611, 613, ... for driving the odd scanning lines SL11, SL13, ... of the LCD panel 100 and the second clock signal Q2 is provided to the even scanning line driving portions 612, 614, ... for driving the even scanning lines SL12, SL14, ... of the LCD panel 100. The capacitors C611–C61n of the respective scanning line driving portions 611–61n may be capacitors which are separately formed from the first TFTs T611–T61n or capacitors having structures in which the source/drain and the gate of the first TFTs T611–T61n are used as two plates and an insulator between the source/drain and the gate is used as an dielectric film.

Furthermore, not shown in drawings, in case where the scanning line driving circuit 600 is integrated to the portion of the lower glass substrate 120 which is overlapped with the upper glass substrate 110, the capacitors C611–C61n may be capacitors having structures in which the source/drain of the first TFTs T611–T61n is used as the lower plate and an indium thin oxide (ITO) which is used for a common voltage terminal Vcom for a LCD and is formed on the upper glass substrate 110 is used as the upper plate and LCs injected between the upper and lower glass substrates 110 and 120 are used as an dielectric film.

The discharging portion 620 comprises a plurality of scanning line discharging portions 621–62m for discharging charges of the scanning lines SL11–SL1n by the scanning line driving signals Vg_out1–vg_outn, respectively. The scanning line discharging portions 621–62m are driven by the scanning line driving signals Vg_out1–Vg_outn to discharge charges charged to the preceding scanning lines SL11–SL1n and comprises a TFT T631–T63m, in each of which a drain is connected to any one of scanning lines, a gate is connected to the next scanning line and a source is connected to a common voltage terminal Vcom.

The operation of the charge transfer type scanning line driving circuit will be described in detail below. Supposed that the first clock signal Q1 of the two-phase clock signals Q1 and Q2 is turned on and the second clock signal Q2 is turned off. The first TFT T611 of the first scanning line driving portion 611 is turned on by the first clock signal Q1 and the input voltage Vin is applied to the gate of the second TFT 621 through the first TFT 611. The second TFT 621 is turned on and the gate voltage Vgh is provided as the first scanning line driving signal vg_out1 to drive the first scanning line SL11 of the LCD panel 100 through the second TFT 621. At this time, charges are charged to the capacitor C611 in accordance with the voltage difference between the voltage of the first clock Q1 applied to the gate of the first TFT T611 and the input voltage Vin.

Subsequently, the first clock signal Q1 is turned off and the second clock signal Q2 is turned on. The first TFT T611 of the first scanning line driving portion 611 is turned off by the first clock signal Q1 and the first TFT T612 of the second scanning line driving portion 612 is turned on by the second clock signal Q2. Accordingly, the charges charged to the capacitor C611 are provided to the capacitor C612 of the second scanning line driving portion 612 through the first TFT T621 and is provided to the gate of the second TFT T622. The second TFT T622 of the second scanning line driving portion 622 is turned on to generate the second scanning line driving signal Vg_out2. The second scanning line driving signal Vg_out2 drives the second scanning line SL12 of the LCD panel 100.

When the second scanning line SL12 is driven by the second scanning line driving signal Vg_out2, the second scanning line driving signal Vg_out2 is applied to the gate of the third TFT T631 in the first scanning line discharging portion 621 of the discharging portion 620. The third TFT T631 is turned on and the charges charged to the first scanning line SL11 are discharged by the first scanning line driving signal Vg_out1 to the common voltage terminal Vcom formed in the upper glass substrate 110 thorough the third TFT T631, thereby disabling the first scanning line SL11.

As above described, with repeatedly turning on and off of the clock signals Q1 and Q2, the first through the nth scanning line driving signals Vg_out1–Vg_outn from the first through the nth scanning line driving portions are sequentially generated to the first through the nth scanning lines SL11–SL1n of the LCD panel 100. Therefore, the first through the nth scanning lines are sequentially driven. Then, when any one of the scanning line driving signals is applied to the corresponding scanning line, the scanning line discharging portions 621–62m of the discharging portion 620 are driven by the scanning line driving signals applied to the previous scanning lines, respectively so that the charges charged to the previous scanning lines are discharged to disable the previous scanning lines. For example, supposed that the third scanning line driving signal Vg_out3 for driving the third scanning line SL13 is generated from the third scanning line driving portion 613, the third scanning line driving signal Vg_out3 drives the third scanning line and turns on the third TFT T632 of the second scanning line discharging portion 622, thereby discharging charges of the second scanning line SL12.

In the scanning line driving circuit of the present invention, not shown in drawing, the nth scanning line driving signal Vg_outn is discharged through the TFT for discharge by the first scanning line driving signal Vg_out1.

As above described, the LCD of the present invention solves the problem of yield and production cost according to the package of the scanning driving circuit by integrating the scanning line driving circuit to the LCD panel. Besides, when one of scanning lines is driven by the corresponding scanning line driving signal, the charges charged to the scanning line by the previous scanning line driving signal are automatically discharged by the corresponding scanning line driving signal so that the malfunction can be prevented and the picture image can be improved.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A scanning line driving circuit adapted for use in a liquid crystal display including an upper substrate, which has a plurality of pixels arranged in a matrix having rows and columns, a lower substrate, which has a plurality of thin film transistors arranged in a matrix having rows and columns by a plurality of data and scanning lines for driving the pixels and on which the scanning line driving circuit is arranged to generate scanning line driving signals for driving the scanning lines, the scanning line driving circuit comprising:

a scanning line driving part for generating scanning line driving signals to drive a first set of the scanning lines and a second set of the scanning lines in response to first and second clock signals; and a discharging part for discharging electrical charges in the first set of the scanning lines through a common electrode in response to the scanning line driving signals from the second set of the scanning lines.

2. A scanning line driving circuit adapted for use in a liquid crystal display including an upper substrate, which has a plurality of pixels arranged in a matrix having rows and columns, and a lower substrate, which has a plurality of thin film transistors arranged in a matrix having rows and columns by a plurality of data and scanning lines for driving the pixels and on which the scanning line driving circuit is arranged to generate scanning line driving signals for driving the scanning lines, the scanning line driving circuit comprising:

a scanning line driving part for generating scanning line driving signals to drive the scanning lines in response to first and second clock signals; and a discharging part for discharging electrical charges in the scanning lines through a common electrode, wherein the scanning line driving part includes:

a first scanning line driving part having a first TFT for transmitting an input signal to a first node in response to the first clock signal, a first capacitor, which is connected between a gate of the first TFT and the first node, and a second TFT for transmitting one of the scanning line driving signals to a corresponding one of the scanning lines in response to a first node signal from the first node; and a second scanning line driving part having a third TFT for transmitting the first node signal to a second node in response to the second clock signal, a second capacitor, which is connected between a gate of the third TFT and the second node, and a fourth TFT for transmitting one of the scanning line driving signals to a corresponding one of the scanning lines in response to a second node signal from the second node.

3. The scanning line driving circuit as claimed in claim 2, wherein the first and second capacitors have the structure in which the source or drain and the gate of the first and third TFTs are used as upper and lower plates and an insulator formed between the upper and lower plates is used as a dielectric film.

4. The scanning line driving circuit as claimed in claim 2, wherein the first and second capacitors have the structure in which the source or drain and common voltage terminal of the first and the third TFTs are used as upper and lower plates and liquid crystals injected between the upper and lower substrates are used as a dielectric film.

5. The scanning line driving circuit as claimed in claim 2, wherein the first and second capacitors are integrated on the lower substrate together with the first and third TFTs.

6. The scanning line driving circuit as claimed in claim 2, wherein the first and second clock signals are two phase clock signals having the same width as that of the gate pulse.

7. The scanning line driving circuit as claimed in claim 2, wherein the discharging part comprises NMOS transistors.

8. A scanning line driving circuit adapted for driving scanning lines of an LCD panel of a liquid crystal display where liquid crystals are injected between an upper glass substrate and a lower substrate in which a thin film transistor array is integrated thereto, comprising:

a driving means for generating scanning line driving signals for driving the scanning lines of the LCD panel according to external clock signals, said driving means including a plurality of scanning line driving means for generating the scanning line driving signals to the scanning lines of the LCD panel according to the clock signals; and a discharging means for discharging the scanning line driving signals from the driving means to a common voltage terminal of the upper substrate, said discharging means including a plurality of scanning line discharging means for discharging the scanning line driving signals generated to the scanning lines from the driving means;

wherein a corresponding one of the scanning line driving signals from the plurality of scanning line driving means in the driving means drives a corresponding one of the plurality of scanning lines and discharges the scanning line driving signal generated to a previous scanning line of the scanning lines through a corresponding one of the plurality of scanning line discharging means in said discharging means.

9. A scanning line driving circuit adapted for driving scanning lines of an LCD panel of a liquid crystal display where liquid crystals are injected between an upper substrate and a lower substrate in which a thin film transistor array is integrated thereto, comprising:

a driving means for generating scanning line driving signals for driving the scanning lines of the LCD panel according to external clock signals, said driving means including a plurality of scanning line driving means for generating the scanning line driving signals to the scanning lines of the LCD panel according to the clock signals, each of the plurality of scanning line driving means including a first thin film transistor (TFT) in which one of the clock signals is applied to a gate thereof; a capacitor connected between the gate and a source of the first TFT; and a second TFT in which the source of the first TFT is connected to a gate thereof and which is driven by the first TFT to generate a corresponding one of the scanning line driving signals to a corresponding one of the scanning lines; and a discharging means for discharging the scanning line driving signals from the driving means, said discharging means including a plurality of scanning line driving means for discharging the scanning line driving signals generated to the scanning lines from the driving means, each of the plurality of scanning line discharging means including a TFT where a drain is connected to a corresponding one of the scanning lines, a gate is connected to a next scanning line of the scanning lines and a source is connected to a common voltage terminal of the upper substrate.

10. A scanning line driving circuit adapted for driving scanning lines of an LCD panel of a liquid crystal display, which includes liquid crystals injected between an upper substrate and a lower substrate and a thin film transistor array integrated into the lower substrate, comprising:

driving means for generating scanning line driving signals for driving the scanning lines of the LCD panel in response to external clock signals; and discharging means for discharging the scanning line driving signals generated to the scanning lines from the driving means through a common voltage terminal of the upper substrate, the discharging means including a plurality of scanning line discharging means for discharging the scanning line driving signals generated to the scanning lines from the driving means through the common voltage terminal of the upper substrate, and each of the plurality of scanning line discharging means discharging the scanning line driving signal generated to a corresponding one of the scanning lines in response to the scanning line driving signal for driving a next scanning line of the scanning lines.

11. The scanning line driving circuit as claimed in claim 10, wherein each of the plurality of scanning line discharging means includes a TFT having a drain connected to a corresponding one of the scanning lines, a gate connected to the next scanning line of the scanning lines and a source connected to the common voltage terminal.

* * * * *